United States Patent
Okamoto et al.

(10) Patent No.: US 7,899,029 B2
(45) Date of Patent: Mar. 1, 2011

(54) MOBILE COMMUNICATION SYSTEM, USER EQUIPMENT IN MOBILE COMMUNICATION SYSTEM, CONTROL PROGRAM THEREOF, AND SYNCHRONIZATION ESTABLISHMENT DETERMINATION METHOD IN MOBILE COMMUNICATION SYSTEM

(75) Inventors: Etsuhiro Okamoto, Osaka (JP);
Yukihiko Okumura, Yokohama (JP);
Tetsuro Kitayama, Katsushika (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 698 days.

(21) Appl. No.: 11/953,523

(22) Filed: Dec. 10, 2007

(65) Prior Publication Data

US 2008/0137633 A1   Jun. 12, 2008

(30) Foreign Application Priority Data

Dec. 11, 2006   (JP) .............................. 2006-333351

(51) Int. Cl.
*H04J 3/06* (2006.01)
*H04W 4/00* (2009.01)

(52) U.S. Cl. ...................................... 370/350; 370/342

(58) Field of Classification Search ................. 370/341, 370/342, 350
See application file for complete search history.

(56) References Cited

U.S. PATENT DOCUMENTS

| | | | |
|---|---|---|---|
| 6,434,130 B1* | 8/2002 | Soininen et al. ............ | 370/331 |
| 6,473,467 B1* | 10/2002 | Wallace et al. ............ | 370/210 |
| 7,336,733 B2* | 2/2008 | Naito ......................... | 375/340 |
| 2002/0115464 A1* | 8/2002 | Hwang et al. .............. | 375/130 |
| 2006/0035661 A1* | 2/2006 | Niwano et al. ............. | 455/522 |
| 2010/0048214 A1* | 2/2010 | Usuda et al. ............... | 455/442 |

FOREIGN PATENT DOCUMENTS

| | | |
|---|---|---|
| JP | 2002-247014 A | 8/2002 |
| JP | 2004-072643 A | 3/2004 |
| JP | 2006-067002 A | 3/2006 |

* cited by examiner

*Primary Examiner*—Benjamin R Bruckart
(74) *Attorney, Agent, or Firm*—Crowell & Moring LLP

(57) ABSTRACT

Even when transmitted waves of multiple systems become approximately out of phase while diversity transmission is performed in a W-CDMA wireless system, synchronization establishment determination is more adequately performed. In a W-CDMA wireless system 1, even if it is determined in a normal synchronization establishment determination that synchronization cannot be established, when a phase difference in a common channel of a 0-system and a 1-system is within a certain range and a reception quality of the common channel (or a dedicated channel) has reached a certain level, it is determined that the synchronization can be established. Therefore, even when the transmitted waves of the multiple systems become approximately out of phase while the diversity transmission is performed in the W-CDMA wireless system, the synchronization establishment determination can be more adequately performed depending on whether or not communication is possible in an actual state.

17 Claims, 3 Drawing Sheets

MOBILE COMMUNICATION SYSTEM, USER EQUIPMENT IN MOBILE COMMUNICATION SYSTEM, CONTROL PROGRAM THEREOF, AND SYNCHRONIZATION ESTABLISHMENT DETERMINATION METHOD IN MOBILE COMMUNICATION SYSTEM

BACKGROUND OF THE INVENTION

1. Field of the Invention

The present invention relates to a mobile communication system for providing communication services to user equipments, the user equipment in the mobile communication system, a control program thereof, and a synchronization establishment determination method in the mobile communication system.

2. Description of the Related Art

In recent years, a mobile communication system using W-CDMA (Wideband-Code Division Multiple Access) has been used as a multiple access method.

In the mobile communication system using the W-CDMA (hereinafter appropriately referred to as "W-CDMA wireless system"), in a user equipment (UE), synchronization establishment determination is performed based on a reception quality of a signal received from a base station, and if the received signal has the reception quality higher than a certain reception quality, it is determined that synchronization has been established.

As such a synchronization determination method, for example, a method of performing the synchronization establishment determination based on a BER (Bit Error Rate) in a pilot signal of a DPCCH (Dedicated Physical Control CHannel) has been known (see JP2006-67002A).

However, transmit power control in the W-CDMA is performed based on the BER of TPC (Transmit Power Control) bits, and according to a specification of the W-CDMA, it is accepted that a transmitted wave power of these TPC bits and a transmitted wave power of the pilot signal may be different from each other.

In other words, the synchronization establishment determination based on the BER of the DPCCH pilot signal is not necessarily accurate, and the determination can be performed more accurately in the synchronization establishment determination based on the BER of the TPC bits which represent a communication state more directly.

Incidentally, if the synchronization establishment determination is performed based on the BER of the TPC bits, a pattern of the TPC bits transmitted from a communication network side to the user equipment cannot be known on the user equipment side, and thus it is difficult to directly measure the BER of the TPC bits.

Consequently, it is conceivable to estimate the BER of the TPC bits by using the DPCCH pilot signal of which known pattern has been transmitted from the communication network side.

However, in the W-CDMA, diversity transmission may be performed in the base station. For example, if the diversity transmission with two systems of 0-system and 1-system is performed, when a phase difference in transmitted waves of the respective systems becomes approximately 180 degrees (out of phase), it is estimated that the transmitted wave power of the TPC bits becomes approximately zero, since the TPC bits have no orthogonality in transmitted signals of the 0-system and the 1-system (that is, the transmitted signals are the same in both the 0-system and the 1-system). This leads to a situation where it is determined that the synchronization cannot be established in spite of a communication state in which the synchronization can be actually established.

SUMMARY OF THE INVENTION

It is an object of the present invention to perform synchronization establishment determination more adequately even when transmitted waves of multiple systems become approximately out of phase while diversity transmission is performed in a W-CDMA wireless system.

In order to achieve the above described object, the present invention is a mobile communication system using W-CDMA, including a base station having a predetermined communicable area and a user equipment which communicates with the above described base station if the user equipment is located in the above described communicable area, the above described base station and the above described user equipment communicating with each other via a common channel commonly used by multiple user equipments (for example, a CPICH in the W-CDMA wireless system) and a dedicated channel individually set for each user equipment (for example, a DCH in the W-CDMA wireless system), the above described user equipment estimating a bit error rate of transmit power control bits (for example, TPC bits in a DPCCH) transmitted from the above described base station to the user equipment via the above described dedicated channel and performing synchronization establishment determination based on the estimated bit error rate, and is characterized in that the above described base station diversity-transmits each channel with respect to the above described user equipment, and that the above described user equipment includes reception quality measurement means which measures a reception quality of a signal including a reception quality of the above described dedicated channel (for example, a dedicated channel quality measurement unit 22 and a common channel quality measurement unit 23 of FIG. 1), phase difference measurement means which measures a phase difference between respective systems diversity-transmitted from the above described base station (for example, a common channel phase difference measurement unit 24 of FIG. 1 or a dedicated channel phase difference measurement unit 26 of FIG. 3), TPC-BER estimation means which estimates the bit error rate of the transmit power control bits in the above described dedicated channel based on the reception quality of the above described dedicated channel measured by the above described reception quality measurement means (for example, a control unit 25 of FIG. 1), and synchronization establishment determination means which performs the synchronization establishment determination in the above described user equipment based on the bit error rate estimated by the above described TPC-BER estimation means, the phase difference between the respective systems measured by the above described phase difference measurement means, and the reception quality measured by the above described reception quality measurement means (for example, the control unit 25 of FIG. 1 which executes a flowchart of FIG. 2).

Moreover, the present invention is a user equipment in a mobile communication system using W-CDMA, the above described mobile communication system including a base station having a predetermined communicable area and the user equipment which communicates with the above described base station if the user equipment is located in the above described communicable area, the above described base station and the above described user equipment communicating with each other via a common channel commonly used by multiple user equipments and a dedicated channel individually set for each user equipment, the above described user equipment estimating a bit error rate of transmit power control bits transmitted from the above described base station to the user equipment via the above described dedicated channel and performing synchronization establishment determination based on the estimated bit error rate, and is characterized in that the above described user equipment includes reception quality measurement means which measures a reception quality of a signal including a reception quality of the above described dedicated channel, phase difference measurement means which measures a phase difference between respective systems diversity-transmitted from the above described base station, TPC-BER estimation means which estimates the bit error rate of the transmit power control bits in the above described dedicated channel based on the reception quality of the above described dedicated channel measured by the above described reception quality measurement means, and synchronization establishment determination means which performs the synchronization establishment determination in the above described user equipment based on the bit error rate estimated by the above described TPC-BER estimation means, the phase difference between the respective systems measured by the above described phase difference measurement means, and the reception quality measured by the above described reception quality measurement means.

Moreover, the present invention is a control program of a user equipment in a mobile communication system using W-CDMA, the above described mobile communication system including a base station having a predetermined communicable area and the user equipment which communicates with the above described base station if the user equipment is located in the above described communicable area, the above described base station and the above described user equipment communicating with each other via a common channel commonly used by multiple user equipments and a dedicated channel individually set for each user equipment, the above described user equipment estimating a bit error rate of transmit power control bits transmitted from the above described base station to the user equipment via the above described dedicated channel and performing synchronization establishment determination based on the estimated bit error rate, and is characterized in that the above described control program causes a computer to realize a reception quality measurement function of measuring a reception quality of a signal including a reception quality of the above described dedicated channel, a phase difference measurement function of measuring a phase difference between respective systems diversity-transmitted from the above described base station, a TPC-BER estimation function of estimating the bit error rate of the transmit power control bits in the above described dedicated channel based on the reception quality of the above described dedicated channel measured by the above described reception quality measurement function, and a synchronization establishment determination function of performing the synchronization establishment determination in the above described user equipment based on the bit error rate estimated by the above described TPC-BER estimation function, the phase difference between the respective systems measured by the above described phase difference measurement function, and the reception quality measured by the above described reception quality measurement function.

Moreover, the present invention is a synchronization establishment determination method in a mobile communication system using W-CDMA, the above described mobile communication system including a base station having a predetermined communicable area and a user equipment which communicates with the above described base station if the user equipment is located in the above described communicable area, the above described base station and the above described user equipment communicating with each other via a common channel commonly used by multiple user equipments and a dedicated channel individually set for each user equipment, the above described user equipment estimating a bit error rate of transmit power control bits transmitted from the above described base station to the user equipment via the above described dedicated channel and performing synchronization establishment determination based on the estimated bit error rate, and is characterized in that the above described synchronization establishment determination method includes a diversity-transmission step of diversity-transmitting each channel from the above described base station with respect to the above described user equipment, and that the above described synchronization establishment determination method includes, in the above described user equipment, a reception quality measurement step of measuring a reception quality of a signal including a reception quality of the above described dedicated channel, a phase difference measurement step of measuring a phase difference between respective systems diversity-transmitted from the above described base station, a TPC-BER estimation step of estimating the bit error rate of the transmit power control bits in the above described dedicated channel based on the reception quality of the above described dedicated channel measured in the above described reception quality measurement step, and a synchronization establishment determination step of performing the synchronization establishment determination in the above described user equipment based on the bit error rate estimated in the above described TPC-BER estimation step, the phase difference between the respective systems measured in the above described phase difference measurement step, and the reception quality measured in the above described reception quality measurement step.

According to these inventions, even in such a case where it is determined in the synchronization establishment determination based on the estimated bit error rate that the synchronization cannot be established, when the phase difference between the respective systems and the reception quality satisfy conditions for the synchronization establishment determination, it is determined that the synchronization can be established.

Therefore, even when the transmitted waves of the multiple systems become approximately out of phase while the diversity transmission is performed in the mobile communication system using the W-CDMA, the synchronization establishment determination can be more adequately performed.

Moreover, the present invention is characterized in that the above described synchronization establishment determination means compares the bit error rate estimated by the above described TPC-BER estimation means with a first threshold (for example, a TPC-BER threshold in "DETAILED DESCRIPTION OF THE PREFERRED EMBODIMENT"), and if the above described bit error rate indicates a better condition than the first threshold, the above described synchronization establishment determination means determines that synchronization can be established; if the above described bit error rate does not indicate a better condition than the first threshold, the above described synchronization establishment determination means determines whether or not the phase difference between the respective systems measured by the above described phase difference measurement means is within a range of a second threshold (for example, a phase difference threshold range in "DETAILED DESCRIPTION OF THE PREFERRED EMBODIMENT"), and if the above described synchronization establishment determination means determines that the phase difference between the respective systems is not within the range of the second threshold, the above described synchronization establishment determination means determines that the synchronization cannot be established; if the above described synchronization establishment determination means determines that the phase difference between the respective systems is within the range of the second threshold, the above described synchronization establishment determination means compares the reception quality measured by the above described reception quality measurement means with a third threshold (for example, a reception quality threshold in "DETAILED DESCRIPTION OF THE PREFERRED EMBODIMENT"), and if the above described reception quality is higher than the third threshold, the above described synchronization establishment determination means determines that the synchronization can be established; and if the above described reception quality is not higher than the third threshold, the above described synchronization establishment determination means determines that the synchronization cannot be established.

Therefore, based on the first to third thresholds set for each of the estimated bit error rate, the phase difference between the respective systems and the reception quality, the synchronization establishment determination can be more adequately performed depending on whether or not the communication is possible in an actual state.

Moreover, the present invention is characterized in that the above described phase difference measurement means measures a phase difference of a pilot signal of the above described common channel in the respective systems.

Therefore, since a common pilot channel can be easily and quickly acquired in the user equipment, the synchronization establishment determination can be performed in a short time.

Moreover, the present invention is characterized in that the above described phase difference measurement means measures a phase difference of a pilot signal of the above described dedicated channel in the respective systems.

Therefore, since it is specified in 3GPP specification that a phase difference of a DPCH pilot signal in a 0-system and a 1-system is measured for generating FBI bits, the phase difference between the respective systems can be measured at low cost, without addition of a new apparatus configuration.

Moreover, the present invention is characterized in that the above described reception quality measurement means measures a reception quality of the pilot signal of the above described common channel.

Therefore, the reception quality can be adequately measured by using the pilot signal of the common channel which is always broadcasted and can be constantly set as a basis for showing a reception state.

Moreover, the present invention is characterized in that the above described reception quality measurement means measures a reception quality of the pilot signal of the above described dedicated channel.

Therefore, the reception quality is measured based on the signal included in the dedicated channel which essentially has an influence on whether or not the synchronization can be established, and thereby a measurement result reflecting an actual reception status of the dedicated channel can be obtained.

According to the present invention, even in such a case where it is determined in the synchronization establishment determination based on the estimated bit error rate that the synchronization cannot be established, when the phase difference between the respective systems and the reception quality satisfy conditions for the synchronization establishment determination, it is determined that the synchronization can be established.

Therefore, even when the transmitted waves of the multiple systems become approximately out of phase while the diversity transmission is performed in the mobile communication system using the W-CDMA, the synchronization establishment determination can be more adequately performed.

DETAILED DESCRIPTION OF THE PREFERRED EMBODIMENTS

An embodiment of a W-CDMA wireless system applied with the present invention will be described below with reference to the drawings.

Figure 1:
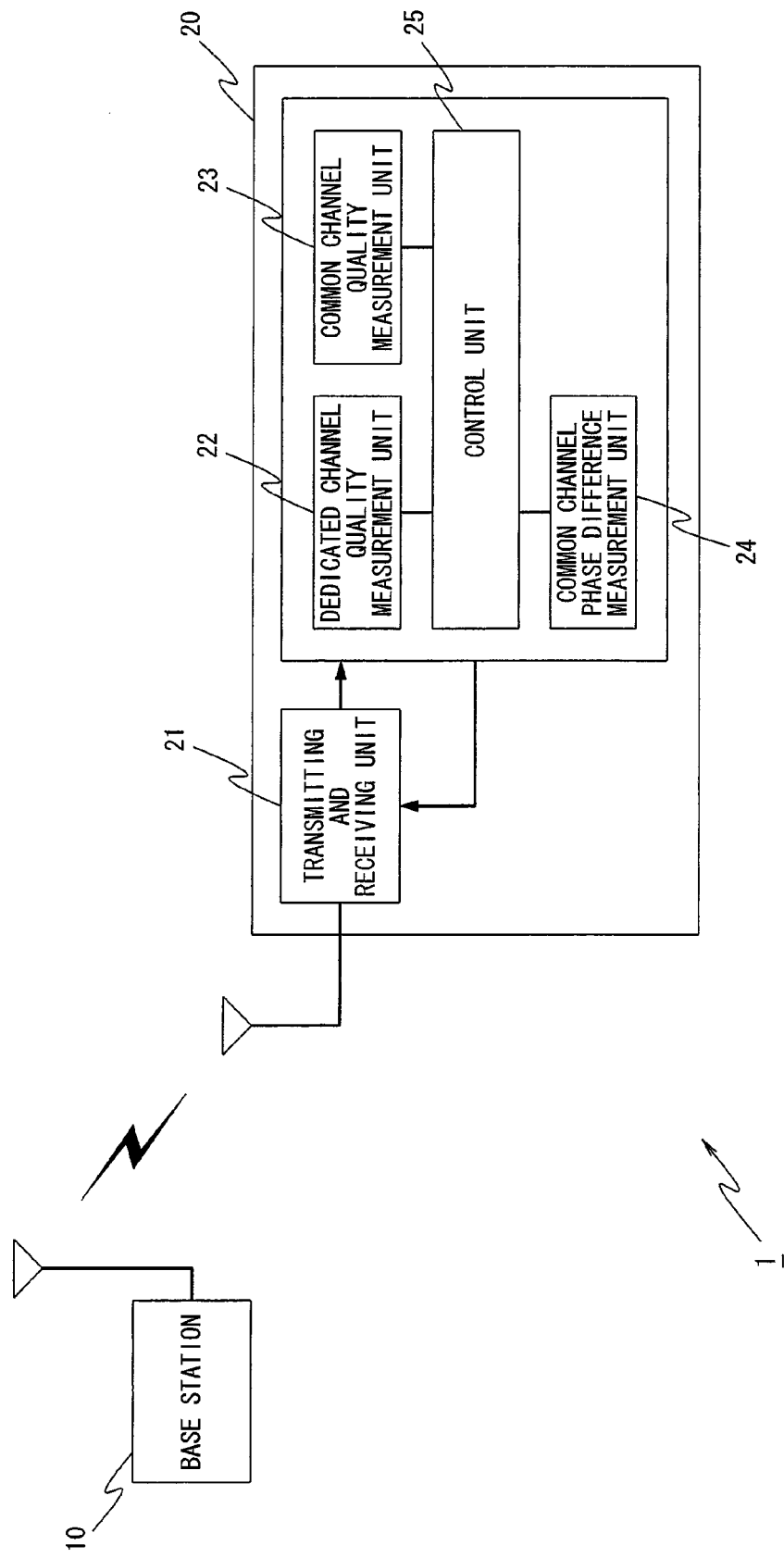
FIG. 1 is a schematic diagram showing a base station and a user equipment in a W-CDMA wireless system 1 according to the present invention.

FIG. 1 is a schematic diagram showing a base station and a user equipment in a W-CDMA wireless system 1 according to the present invention.

In FIG. 1, the W-CDMA wireless system 1 includes a base station 10 and a user equipment 20, and transmit diversity with a transmission system having two systems (which are assumed as a 0-system and a 1-system) is performed from the base station 10 with respect to the user equipment 20.

The base station 10 is provided with a base station function in a mobile communication system using W-CDMA.

Specifically, the base station 10 establishes communication based on the W-CDMA with the user equipment 20 in a communicable area of the base station 10, and communicates with the user equipment 20 via a common channel including a common pilot channel (CPICH) and a dedicated channel including a dedicated physical channel (DPCH), as physical channels.

Among these channels, the common pilot channel is a channel for continuously transmitting a scrambling code (PN code) of the base station 10, and this channel is broadcasted to all user equipments 20.

One dedicated physical channel is assigned to each user equipment 20, and the dedicated physical channel is a channel for transmitting and receiving user data. Moreover, a DCH (Dedicated CHannel) in a transport channel is assigned to the dedicated physical channel, and furthermore, a DCCH (Dedicated Control CHannel) and a DTCH (Dedicated Traffic CHannel) in logical channels are assigned to the DCH.

The base station 10 transmits and receives the user data with respect to the user equipment 20 via the DTCH, and transmits and receives control information via the DCCH.

It should be noted that these channel are set corresponding to each of the two systems of the transmit diversity.

The user equipment 20 is provided with a transmitting and receiving unit 21, a dedicated channel quality measurement unit 22, a common channel quality measurement unit 23, a common channel phase difference measurement unit 24 and a control unit 25. It should be noted that the user equipment 20 is provided with a CPU (Central Processing Unit), a main memory, a nonvolatile storage device and a display device as hardware, and the CPU reads various programs stored in the nonvolatile storage device and executes the programs to realize various functions.

The transmitting and receiving unit 21 performs frequency conversion or a demodulation process and data decomposition based on the W-CDMA with respect to a wireless signal received via an antenna, and outputs a result of the process to the control unit 25. Also, the transmitting and receiving unit 21 performs data multiplexing or a modulation process and the frequency conversion based on the W-CDMA with respect to a signal inputted from the control unit 25, and transmits a result of the process via the antenna.

The dedicated channel quality measurement unit 22 measures an Ec/IO (a ratio of a desired wave received signal energy to a total received energy) and a reception level of pilot bits of the dedicated channel (pilot bits of a DPCCH), and a reception level of TPC bits, and outputs a result of the measurement to the control unit 25.

The common channel quality measurement unit 23 measures a reception quality of the common channel (common pilot channel) in the communication between the base station 10 and the user equipment 20, and outputs a result of the measurement to the control unit 25. The common pilot channel is always broadcasted in a state of being orthogonal at the 0-system and the 1-system. Moreover, the common pilot channel is used in the user equipment 20 to measure a time base of the base station 10, and code spreading has not been performed therein. Thus, the common pilot channel can be easily and quickly acquired in the user equipment 20 and also its reception quality can be constantly set as a basis for showing a reception state in the user equipment 20.

Here, the reception quality measured by the common channel quality measurement unit 23 can be, for example, an RSCP (Received Signal Code Power), a received Ec/NO (desired signal-to-noise power ratio), a bit error rate (BER), an SIR or the like.

The common channel phase difference measurement unit 24 measures a phase difference of the common channel (common pilot channel) of the 0-system and the 1-system in the communication between the base station 10 and the user equipment 20, and outputs a result of the measurement to the control unit 25.

The control unit 25 controls the entire user equipment 20, and estimates an offset value between a DPCCH pilot bit transmit power and a TPC bit transmit power which are set in the base station, from a difference between the reception level of the pilot bits of the dedicated channel and the reception level of the TPC bits which have been inputted by the dedicated channel quality measurement unit 22. In this estimation, a difference between the DPCCH pilot bit transmit power and the TPC bit transmit power can be used as the offset value, or the offset value can be calculated from a ratio of both.

Then the control unit 25 calculates the BER (estimated value) of the TPC bits based on the estimated offset value and the Ec/IO in the pilot bits of the dedicated channel inputted by the dedicated channel quality measurement unit 22.

Moreover, in a synchronization establishment determination process which will be described later, the control unit 25 compares the calculated BER of the TPC bits with a threshold set for the BER of the TPC bits for synchronization establishment determination (hereinafter referred to as "TPC-BER threshold"), and if the control unit 25 determines that the BER of the TPC bits is lower than the TPC-BER threshold, the control unit 25 compares the phase difference of the common channel of the 0-system and the 1-system, which has been inputted by the common channel phase difference measurement unit 24, with a criterion range set for the phase difference of the common channel for the synchronization establishment determination (hereinafter referred to as "phase difference threshold range"). Then, if the control unit 25 determines that the phase difference of the common channel of the 0-system and the 1-system is within the phase difference threshold range, the control unit 25 compares the reception quality of the common channel with a threshold set for the reception quality for the synchronization establishment determination (hereinafter referred to as "reception quality threshold"). Furthermore, if the control unit 25 determines that the reception quality of the common channel is higher than the reception quality threshold, the control unit 25 determines that it is a state in which synchronization can be established.

It should be noted that if the reception quality is determined, the determination can also be performed based on a reception quality of the dedicated channel in addition to the reception quality of the common channel, and in this case, the reception quality threshold for the dedicated channel is set.

Next, operations of the W-CDMA wireless system 1 will be described.

Figure 2:
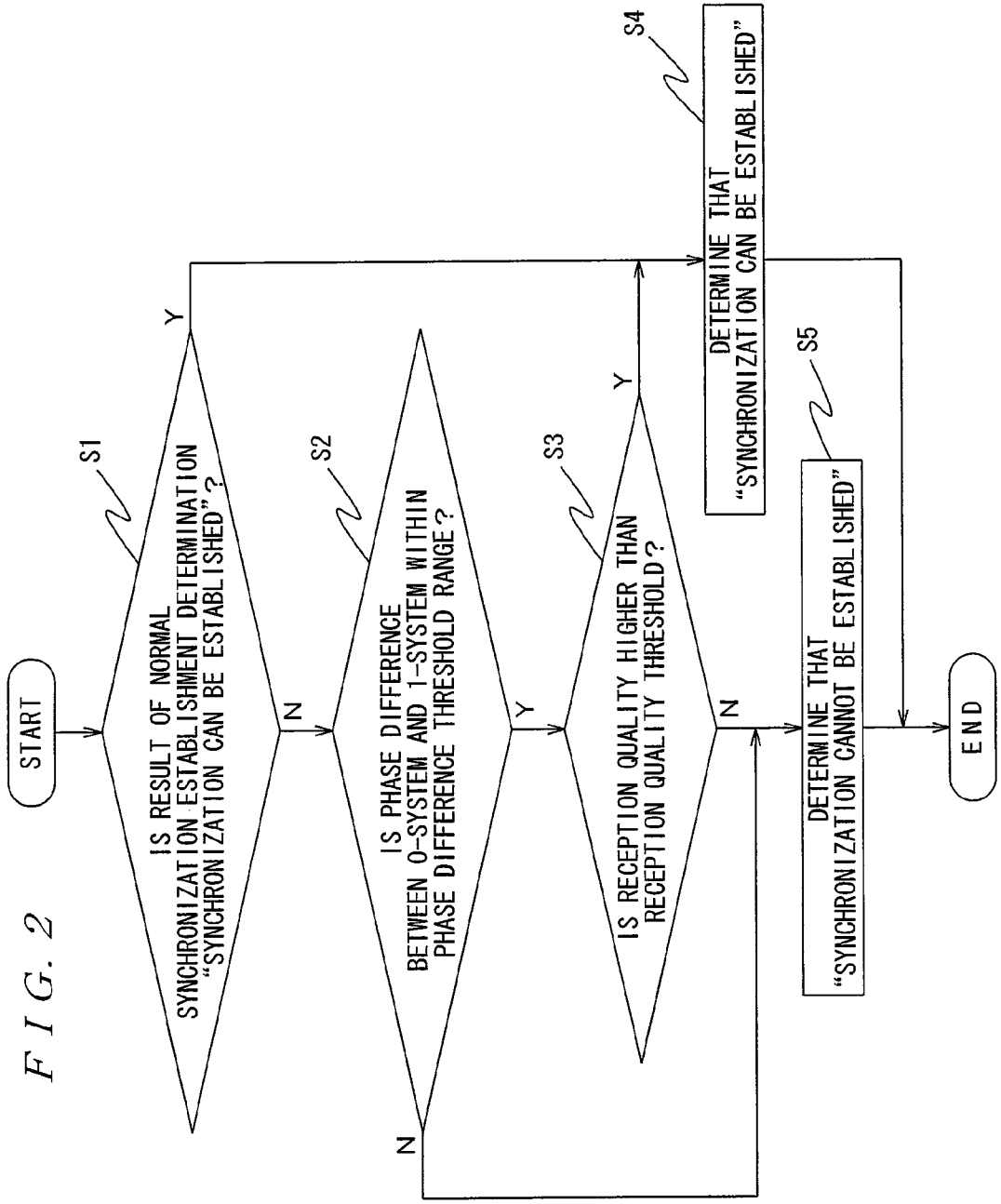
FIG. 2 is a flowchart showing a synchronization establishment determination process executed by a control unit 25.

FIG. 2 is a flowchart showing a synchronization establishment determination process executed by the control unit 25.

The synchronization establishment determination process is executed when the dedicated channel is set, such as when the communication of the user equipment 20 is started.

When the synchronization establishment determination process is started, the control unit 25 determines whether or not a result of normal synchronization establishment determination (synchronization establishment determination in accordance with 3GPP specification) has been "the synchronization can be established", based on the BER of the TPC bits being lower than the TPC-BER threshold (for example, whether or not the BER of the TPC bits is not >20%) (step S1).

At step S1, if it has not been determined that "the synchronization can be established" in the normal synchronization establishment determination, the control unit 25 determines whether or not the phase difference of the common channel of the 0-system and the 1-system is within the phase difference threshold range (for example, whether or not the phase difference of the CPICH of the O-system and the 1-system is within 145 degrees±30 degrees) (step S2).

At step S2, if it is determined that the phase difference of the common channel of the 0-system and the 1-system is within the phase difference threshold range, the control unit 25 determines whether or not the reception quality of the common channel is higher than the reception quality threshold (for example, whether or not the Ec/NO of the pilot bits of the CPICH is >−15 dB) (step S3).

If it has been determined that "the synchronization can be established" in the normal synchronization establishment determination at step S1, as well as if it is determined that the reception quality of the common channel is higher than the reception quality threshold at step S3, the control unit 25 determines that a determination result in the synchronization establishment determination process is "the synchronization can be established" (step S4), and terminates the process.

On the other hand, if it is determined that the phase difference of the common channel of the 0-system and the 1-system is not within the phase difference threshold range at step S2, as well as if it is determined that the reception quality of the common channel is not higher than the reception quality threshold at step S3, the control unit 25 determines that the determination result in the synchronization establishment determination process is "the synchronization cannot be established" (step S5), and terminates the process.

It should be noted that the channel to be used for the determination of the reception quality at step S3 can be the dedicated channel as described above. In this case, a determination criterion at step S2 can be, for example, whether or not the SIR of the pilot bits of the DPCH is >−5 dB.

According to the operations as described above, in a status where the transmit diversity is performed, it is possible to determine that "the synchronization can be established" according to a synchronization establishment determination criterion based on the present invention.

As described above, in the W-CDMA wireless system 1 according to this embodiment, even if it is determined in the normal synchronization establishment determination that the synchronization cannot be established, when the phase difference in the common channel of the 0-system and the 1-system is within a certain range and the reception quality of the common channel (or the dedicated channel) has reached a certain level, it is determined that the synchronization can be established.

Therefore, even when transmitted waves of multiple systems become approximately out of phase while the diversity transmission is performed in the W-CDMA wireless system, the synchronization establishment determination can be more adequately performed depending on whether or not the communication is possible in an actual state.

(Application 1)

In the description of the above described embodiment, the phase difference of the common channel of the 0-system and the 1-system is measured, and in the synchronization establishment determination process, it is determined whether or not the difference between them is within the set threshold. However, pilot signals orthogonalized at the 0-system and the 1-system in the dedicated channel can be used to determine the phase difference between the 0-system and the 1-system.

Figure 3:
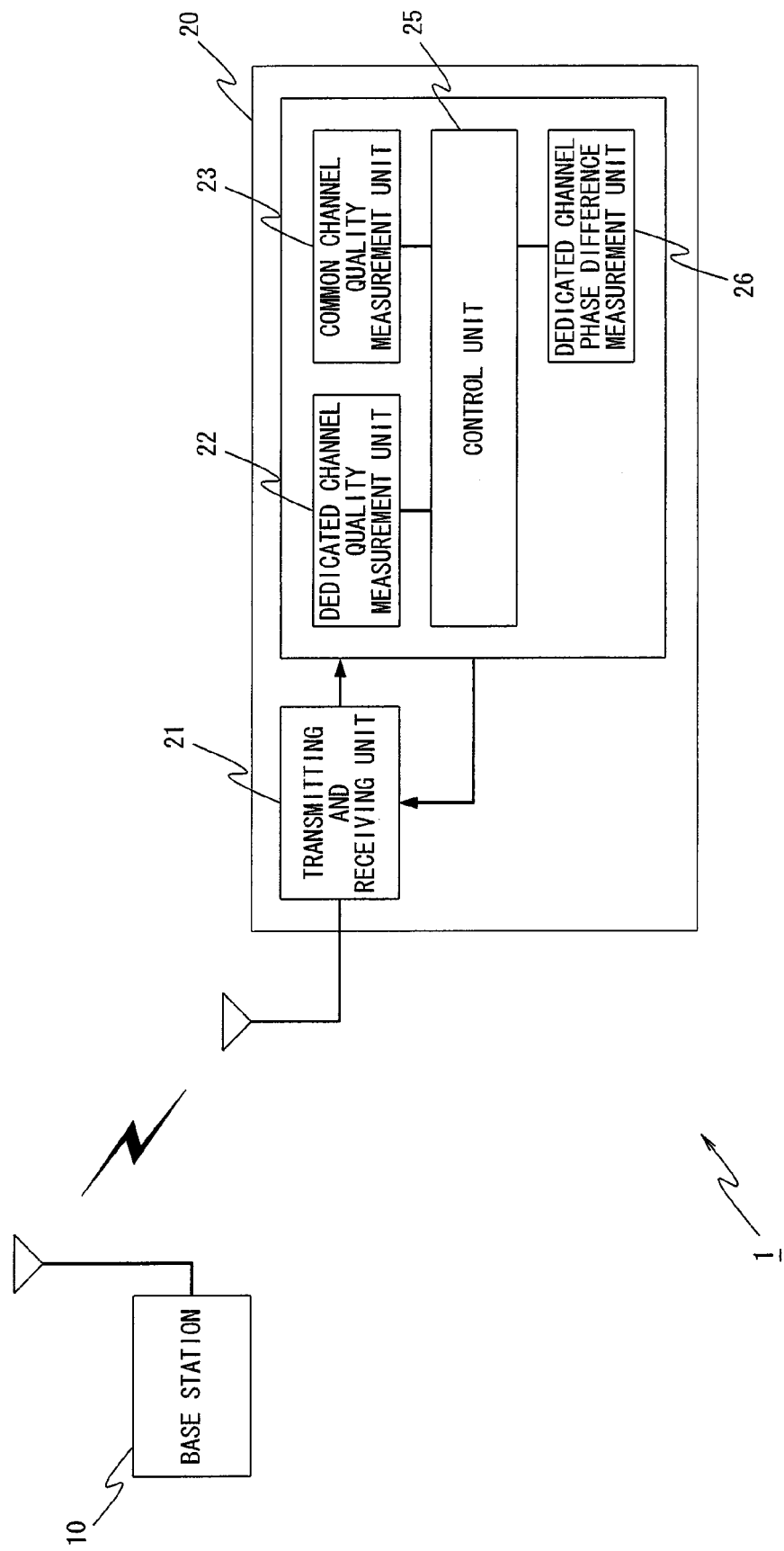
FIG. 3 is a diagram showing a configuration of a user equipment 20 in the case of determining a phase difference between a 0-system and a 1-system by using a pilot signal of a dedicated channel.

FIG. 3 is a diagram showing a configuration of the user equipment 20 in the case of determining the phase difference between the 0-system and the 1-system by using the pilot signal of the dedicated channel.

The configuration shown in FIG. 3 is different from that shown in FIG. 1 in that a dedicated channel phase difference measurement unit 26 is provided instead of the common channel phase difference measurement unit 24.

The dedicated channel phase difference measurement unit 26 measures a phase difference of the dedicated channel in the two systems (the 0-system and the 1-system) with which the transmit diversity is performed, and outputs a result of the measurement to the control unit 25.

Specifically, based on the pilot signal in the DPCH of each of the 0-system and the 1-system (that is, the pilot bits of the DPCCH), the dedicated channel phase difference measurement unit 26 measures the phase difference of the dedicated channel in the respective systems.

In this case, in the synchronization establishment determination process, the control unit 25 determines whether or not the phase difference between the 0-system and the 1-system which has been measured by the dedicated channel phase difference measurement unit 26 is within the phase difference threshold range. The determination criterion at step S2 of the flowchart shown in FIG. 2 can be, for example, whether or not the phase difference of the DPCH in the 0-system and the 1-system is within 180 degrees±30 degrees.

In this way, if the pilot signal of the dedicated channel is used to determine the phase difference between the 0-system and the 1-system, since it is specified in the 3GPP specification that the phase difference of the DPCH pilot signal in the 0-system and the 1-system is measured for generating FBI (FeedBack Information) bits, this function can be used to provide a function of the dedicated channel phase difference measurement unit 26 without addition of a new apparatus configuration.

What is claimed is:

1. A mobile communication system using W-CDMA, comprising a base station having a predetermined communicable area and a user equipment which communicates with said base station if the user equipment is located in said communicable area, said base station and said user equipment communicating with each other via a common channel commonly used by multiple user equipments and a dedicated channel individually set for each user equipment, said user equipment estimating a bit error rate of transmit power control bits transmitted from said base station to the user equipment via said dedicated channel and performing synchronization establishment determination based on the estimated bit error rate, wherein said base station diversity-transmits each channel with respect to said user equipment, and wherein said user equipment comprises:

reception quality measurement means which measures a reception quality of a signal including a reception quality of said dedicated channel;

phase difference measurement means which measures a phase difference between respective systems diversity-transmitted from said base station;

TPC-BER estimation means which estimates the bit error rate of the transmit power control bits in said dedicated channel based on the reception quality of said dedicated channel measured by said reception quality measurement means; and synchronization establishment determination means which performs the synchronization establishment determination in said user equipment based on the bit error rate estimated by said TPC-BER estimation means, the phase difference between the respective systems measured by said phase difference measurement means, and the reception quality measured by said reception quality measurement means.

2. The mobile communication system according to claim 1, wherein:

said synchronization establishment determination means compares the bit error rate estimated by said TPC-BER estimation means with a first threshold, and if said bit error rate indicates a better condition than the first threshold, said synchronization establishment determination means determines that synchronization can be established;

if said bit error rate does not indicate a better condition than the first threshold, said synchronization establishment determination means determines whether or not the phase difference between the respective systems measured by said phase difference measurement means is within a range of a second threshold, and if said synchronization establishment determination means determines that the phase difference between the respective systems is not within the range of the second threshold, said synchronization establishment determination means determines that the synchronization cannot be established;

if said synchronization establishment determination means determines that the phase difference between the respective systems is within the range of the second threshold, said synchronization establishment determination means compares the reception quality measured by said reception quality measurement means with a third threshold, and if said reception quality is higher than the third threshold, said synchronization establishment determination means determines that the synchronization can be established; and if said reception quality is not higher than the third threshold, said synchronization establishment determination means determines that the synchronization cannot be established.

3. The mobile communication system according to claim 2, wherein said phase difference measurement means measures a phase difference of a pilot signal of said common channel in the respective systems.

4. The mobile communication system according to claim 2, wherein said phase difference measurement means measures a phase difference of a pilot signal of said dedicated channel in the respective systems.

5. The mobile communication system according to claim 2, wherein said reception quality measurement means measures a reception quality of the pilot signal of said common channel.

6. The mobile communication system according to claim 2, wherein said reception quality measurement means measures a reception quality of the pilot signal of said dedicated channel.

7. The mobile communication system according to claim 1, wherein said phase difference measurement means measures a phase difference of a pilot signal of said common channel in the respective systems.

8. The mobile communication system according to claim 7, wherein said reception quality measurement means measures a reception quality of the pilot signal of said common channel.

9. The mobile communication system according to claim 7, wherein said reception quality measurement means measures a reception quality of the pilot signal of said dedicated channel.

10. The mobile communication system according to claim 1, wherein said phase difference measurement means measures a phase difference of a pilot signal of said dedicated channel in the respective systems.

11. The mobile communication system according to claim 10, wherein said reception quality measurement means measures a reception quality of the pilot signal of said common channel.

12. The mobile communication system according to claim 10, wherein said reception quality measurement means measures a reception quality of the pilot signal of said dedicated channel.

13. The mobile communication system according to claim 1, wherein said reception quality measurement means measures a reception quality of the pilot signal of said common channel.

14. The mobile communication system according to claim 1, wherein said reception quality measurement means measures a reception quality of the pilot signal of said dedicated channel.

15. A user equipment in a mobile communication system using W-CDMA, said mobile communication system comprising a base station having a predetermined communicable area and the user equipment which communicates with said base station if the user equipment is located in said communicable area, said base station and said user equipment communicating with each other via a common channel commonly used by multiple user equipments and a dedicated channel individually set for each user equipment, said user equipment estimating a bit error rate of transmit power control bits transmitted from said base station to the user equipment via said dedicated channel and performing synchronization establishment determination based on the estimated bit error rate, wherein said user equipment comprises:

reception quality measurement means which measures a reception quality of a signal including a reception quality of said dedicated channel;

phase difference measurement means which measures a phase difference between respective systems diversity-transmitted from said base station;

TPC-BER estimation means which estimates the bit error rate of the transmit power control bits in said dedicated channel based on the reception quality of said dedicated channel measured by said reception quality measurement means; and synchronization establishment determination means which performs the synchronization establishment determination in said user equipment based on the bit error rate estimated by said TPC-BER estimation means, the phase difference between the respective systems measured by said phase difference measurement means, and the reception quality measured by said reception quality measurement means.

16. A user equipment in a mobile communication system using W-CDMA, said mobile communication system comprising a base station having a predetermined communicable area and the user equipment which communicates with said base station if the user equipment is located in said communicable area, said base station and said user equipment communicating with each other via a common channel commonly used by multiple user equipments and a dedicated channel individually set for each user equipment, said user equipment estimating a bit error rate of transmit power control bits transmitted from said base station to the user equipment via said dedicated channel and performing synchronization establishment determination based on the estimated bit error rate, wherein said user equipment comprises:

reception quality measurement means which measures a reception quality of a signal including a reception quality of said dedicated channel;

phase difference measurement means which measures a phase difference between respective systems diversity-transmitted from said base station;

TPC-BER estimation means which estimates the bit error rate of the transmit power control bits in said dedicated channel based on the reception quality of said dedicated channel measured by said reception quality measurement means; and synchronization establishment determination means which performs the synchronization establishment determination in said user equipment based on the bit error rate estimated by said TPC-BER estimation means, the phase difference between the respective systems measured by said phase difference measurement means, and the reception quality measured by said reception quality measurement means.

17. A synchronization establishment determination method in a mobile communication system using W-CDMA, said mobile communication system comprising a base station having a predetermined communicable area and a user equipment which communicates with said base station if the user equipment is located in said communicable area, said base station and said user equipment communicating with each other via a common channel commonly used by multiple user equipments and a dedicated channel individually set for each user equipment, said user equipment estimating a bit error rate of transmit power control bits transmitted from said base station to the user equipment via said dedicated channel and performing synchronization establishment determination based on the estimated bit error rate, wherein said synchronization establishment determination method comprises a diversity-transmission step of diversity-transmitting each channel from said base station with respect to said user equipment, and wherein said synchronization establishment determination method comprises in said user equipment:

a reception quality measurement step of measuring a reception quality of a signal including a reception quality of said dedicated channel;

a phase difference measurement step of measuring a phase difference between respective systems diversity-transmitted from said base station;

a TPC-BER estimation step of estimating the bit error rate of the transmit power control bits in said dedicated channel based on the reception quality of said dedicated channel measured in said reception quality measurement step; and a synchronization establishment determination step of performing the synchronization establishment determination in said user equipment based on the bit error rate estimated in said TPC-BER estimation step, the phase difference between the respective systems measured in said phase difference measurement step, and the reception quality measured in said reception quality measurement step.

\* \* \* \* \*